March 3, 1970  R. M. BEDNARSKI  3,498,025
ADSORPTION PROCESS AND APPARATUS
Filed June 25, 1968  2 Sheets-Sheet 2

INVENTOR.
ROY M. BEDNARSKI
BY
Meyer, Tilberry & Body
ATTORNEYS

United States Patent Office 3,498,025
Patented Mar. 3, 1970

3,498,025
ADSORPTION PROCESS AND APPARATUS
Roy M. Bednarski, Parma Heights, Ohio, assignor to Alco Standard Corporation, Cleveland, Ohio, a corporation of Ohio
Filed June 25, 1968, Ser. No. 739,857
Int. Cl. B01d 53/04
U.S. Cl. 55—33                                      13 Claims

ABSTRACT OF THE DISCLOSURE

An adsorption process and apparatus wherein a feed stream fed alternately through first and second adsorption beds remove therefrom components which are adsorbable in the beds produce a product stream. While one of the beds is on an adsorption cycle, the other bed is being desorbed. Regeneration of the bed being desorbed is improved by carrying out the desorption step at a high vacuum of at least about 26″ Hg, preferably at least about 28″ Hg (about 49 mm. Hg abs.), impressed upon the bed first by means of a jet pump, and then by means of a lobe type rotary pump.

---

Figure 1:
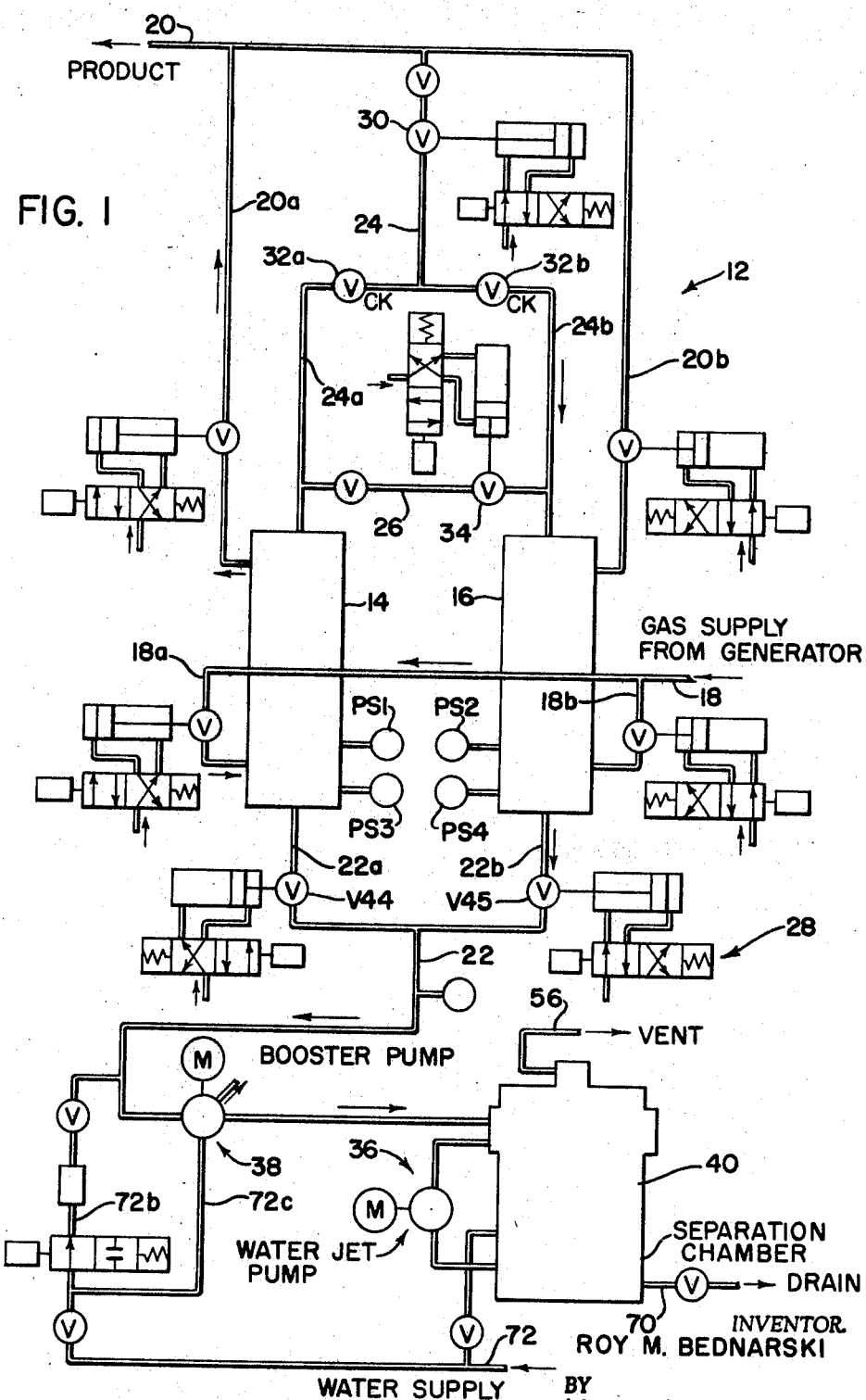

The present invention relates to an adsorption process and apparatus, and in particular to improvements in the desorption phase of the process.

In the purification and separation of gas mixtures which contain adsorbable components, a known process involves conducting the gases through one of two adsorption beds which are connected in parallel. These adsorption beds are alternately and simultaneously charged and then regenerated or desorbed. In the adsorption phase, the gas to be treated is passed for a period of time through one adsorbent bend until the adsorptive material therein becomes contaminated with impurities to the extent that product purity has declined to near its breakthrough point or specified limit. At this point the flow of gas is switched to the other bed, and the bed which was on adsorption is switched to reactivation or desorption.

Reactivation or desorption may be accomplished by one of two well known methods, changing the pressure in the bed, or changing the temperature in the bed, both of which change the bed loading. If the bed is heated, its capacity for holding the adsorbate decreases, and similarly, if the pressure in the bed is reduced, the equilibrium loading on the adsorbent bed decreases with the lower pressure.

The thermal-swing cycle is more commonly employed, a major advantage of this cycle being that high differential loadings of adsorbate may be obtained. However, heating and cooling equipment must be employed, increasing the cost of the operation and capital costs. Also, powdering of the adsorbent material may occur attributable to frequent thermal expansion and contraction.

The pressure swing cycle, involving decreasing the pressure in the system during the desorption phase, has the advantage that the equipment employed is simpler, requiring fewer and less complicated controls, and that greater flexibility is available. However, some difficulties are experienced even in the pressure swing cycle; one being the problem that the adsorbent which is easily powdered may be subjected to mechanical attrition during rapid pressure changes.

One conventional pressure-swing cycle which is employed is called the "heatless" cycle, wherein the adsorption step is carried out at high pressure, for instance 30 to 50 pounds per square inch gage, and the pressure swings are very rapid in the order of 20 seconds to a minute, at most three minutes, for an adsorption or desorption step. It is well known that heat is liberated during the adsorption stage (heat of adsorption) tending to warm an adsorbent bed, and conversely, heat is taken up during desorption tending to chill an adsorbent bed (heat of desorption). As the bed is warmed its adsorption capacity decreases, and conversely, as the bed chills its capacity for holding an adsorbate increases. The object in the "heatless" process is to minimize the effects of the heats of adsorption and desorption as much as possible, the theory being that the rapid cycling causes the heats of adsorption and desorption to balance without detectable cooling or heating of the beds.

Several difficulties are experienced in the "heatless" process, one being the problem of recompression to the high adsorption pressure, and the associated costs accompanying the use of a compressor. High pressure is a prerequisite of the process since rapid cycling requires the use of small sized beds. Reasonable capacities (volume flow per sizing of beds) could not be obtained unless adsorption were carried out at high pressure.

Another difficulty which is experienced is that desorption is usually carried out at near atmospheric pressure since the system would be uneconomical if vacuum equipment was required in addition to compression equipment. This imposes a definite limitation on the process, namely on the product purity which can be obtained. The reason for this is that residual loading of the bed remains relatively high if desorption is carried out at atmospheric pressure, and, for a given capacity system, the desorption stroke is critical in determining product purity. To explain this further, an adsorbent material will have a maximum set loading dependent upon product purity requirements since as the loading is increased, the product purity declines. The decrease in product purity or increase in loading beyond a predetermined point is termed a "breakthrough" in the product purity. During the desorption step, the loading is decreased an amount depending upon the desorption conditions, the loading never being carried to absolute dryness or zero percent loading. As a result the loading will vary during adsorption and desorption between certain percentages of maximum, for instance with respect to the adsorption of water vapor, between 13 and 16 percent of maximum loading, so the capacity of the system becomes a function of the percent increase in loading available during the adsorption step.

Clearly, the upper limit of loading is set by the product purity requirement, and equally clearly, the capacity of the system becomes a function of the lower percent loading which can be obtained during the desorption step making this step critical in the overall operation.

It is also clear that the desorption period cannot equal the adsorption period if the process is to be continuous since some time must be allotted for repressurizing the bed. Accordingly, in the short cycle period, of the "heatless" process and even shorter desorption cycle period, it becomes a difficult task to obtain a high reduction in loading, the residual loading on a bed remaining relatively high. Attempts have been made to overcome this problem, one being the use of large purge rates with product gas. However, typical purge rates have been in the order of about 30% in the "heatless" process, creating a problem in itself towards obtaining maximum product yields.

It is known to employ a vacuum during desorption, but usually the vacuums employed are moderate, in the order of 200 mm. Hg abs. the limiting feature being the vacuum pump. Mechanical reciprocating pumps have been used to impose a vacuum upon beds of the type in question and are capable of high vacuums. However, such pumps have proved to be unsatisfactory for a number of reasons. One reason is that the pumps must be lubricated with oil, and back-streaming of oil is possible (a physical movement of molecules in an upstream direction when the flow is shut off) depositing hydrocarbons on the bed being desorbed thereby contaminating the bed. In addition, because of the large volumes of gas involved at atmopheric pressure, the mechanical pumps have a tendency to stall if started at atmospheric pressure. Elaborate schemes have been devised to start the pump with a partial vacuum, one such scheme being switching the beds prior to full repressurizing of the bed being desorbed. The beds are connected together thereby applying a partial vacuum to the bed going from adsorption onto desorption, permitting start-up of the desorption step at a partial vacuum. This has the disadvantage that the feed and product flows must be stopped for a period of time while the two beds are being equalized in pressure. It also has the disadvantage that switching of the beds at vacuum is likely to jar and perhaps pulverized the bed.

As a further disadvantage with the mechanical type pump, pipe scale and similar matter can flow into the pump causing possible jamming of the pump piston. Another disadvantage is that if a purge flow is used, the mechanical pump being limited in capacity cannot handle as high a purge rate as may be desired.

It is an object of the preesnt invention to overcome the above disadvantages.

It is a further object of the invention to provide an improved vacuum system in which the high vacuums required to achieve economically a predetermined purity can conveniently be obtained.

Although the present invention is useful with many types of separations, it is particularly of advantage in the removal of such gases as carbon dioxide, hydrogen sulfide, ammonia, and water vapor from hydrogen, helium, nitrogen, argon, neon, krypton and oxygen. The invention is particularly useful in the removal of carbon dioxide and water vapor from nitrogen.

A preferred adsorption material in accordance with the invention is the molecular sieve type adsorbent. The molecular sieves have a sorption area available on the inside of each particle of a large number of uniformly sized pores of molecular dimension. With such an arrangement, molecules of a certain size and shape enter the pores and are adsorbed while larger and differently shaped molecules are excluded. Particularly preferred are the synthetic zeolitic molecular sieve materials. A well known property of these materials is that they are capable of adsorbing large quantities of adsorbate either at very low pressure, at very low partial pressures or at very low concentrations.

The objects of the invention are achieved by providing, in a process for the separation of adsorbable components from a gas mixture, the steps of flowing a feed stream alternately to first and second adsorption beds in an adsorption period to remove therefrom components which are adsorbable in the beds and to produce a product stream, adsorption being at near atmospheric pressure and terminated prior to a breakthrough of an arbitrarily set product purity limit. Simultaneous with the adsorption step, the bed not on an adsorption cycle is desorbed during a desorption period to reduce the loading on the bed, the desorption period being carried out at a high vacuum of at least about 26" Hg, preferably at least about 28" Hg (less than about 49 mm. Hg absolute). Following desorption, the bed is repressurized to the adsorption pressure, the combined periods for desorption and repressurizing substantially equalling the period for adsorption.

Preferably, the vacuum is obtained in a first roughing step by using a jet-type pump, followed by a finishing step using a lobe-type rotary pump, the lobe pump being turned on automatically when a predetermined vacuum has been reached by use of the jet pump.

For the adsorption of water vapor and carbon dioxide from a nitrogen gas, the period of adsorption is less than 10 minutes, to achieve a product purity of less than .1% $CO_2$ and a water vapor dew point of less than $-50°$ F.

The use of a jet pump as a roughing vacuum means has the advantage that it can draw a vacuum starting at atmospheric pressure. The jet pump is limited in the magnitude of the vacuum which it can draw, so that the use of the lobe-type rotary pump brings the bed to the desired vacuum of more than 26" Hg and preferably more than 28" Hg. Also the capacity of the jet pump is limited and the lobe pump readily handles whatever purge flow is required.

Figure 2:
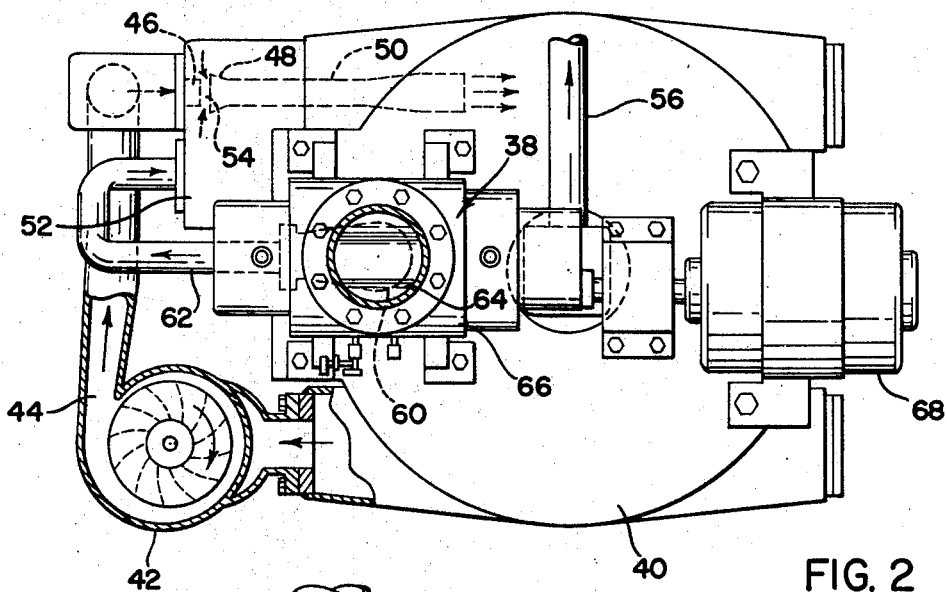
Figure 3:
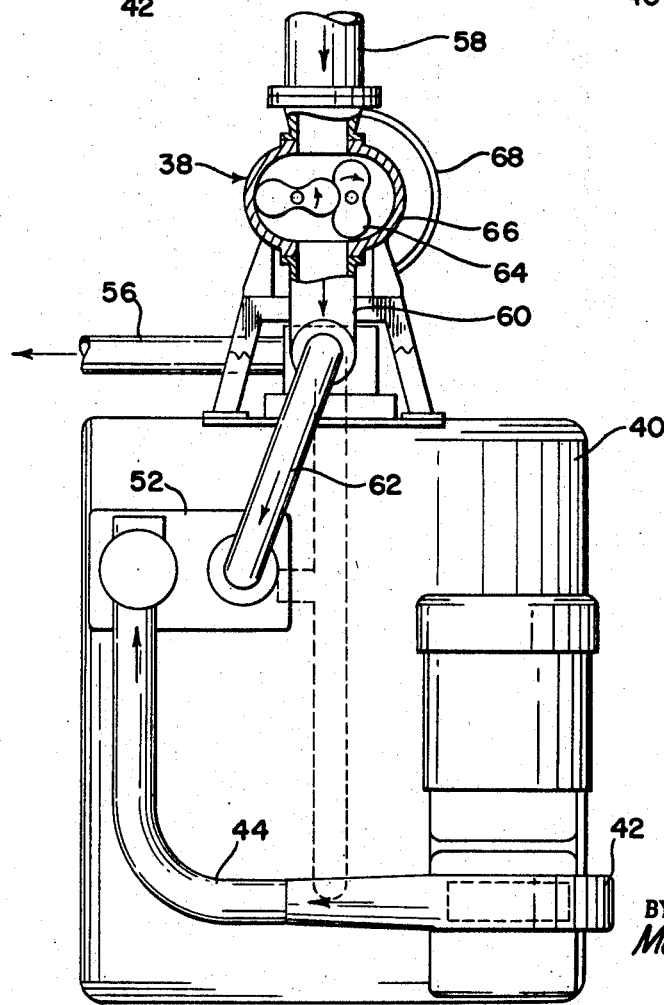

The invention and advantages thereof will become more apparent upon consideration of the following specification, with reference to the accompanying drawings, in which FIGURE 1 represents a schematic flow diagram illustrating the invention;

FIGURE 2 is a plan, partial section view illustrating the vacuum pump arrangement in accordance with the invention; and FIGURE 3 is an elevation partial section view illustrating the vacuum pump arrangement of FIG. 2.

Referring to the drawings, and in particular, FIG. 1, the system is designed for the removal of carbon dioxide and water vapor from a nitrogen gas, primarily to produce an inert nitrogen atmosphere for the metal heat treating industry and blanketing atmosphere for use in the chemical industry. Typical purity specifications for the inert gas will require less than .1% $CO_2$, and a water vapor dew point of less than $-50°$ F.

The raw gas is produced in an inert generator (not shown), wherein air and natural gas are supplied to a burner. Combustion takes place in a partially refractory lined firing tube, and the proportion or ratio of air to natural gas is such as to produce primarily a nitrogen, carbon dioxide and water vapor mixture, with some carbon monoxide. Typically, the product gases will be about 11% $CO_2$ and about 88% $N_2$, and at near atmospheric pressure, about one p.s.i.g.

The products of combustion exit from the combustion chamber and enter a cooler or quench drum (also not shown) where the hot gases are subjected to direct cooling with a water stream. The hot gases are cooled to near the temperature of the cooling water utilized, about 15° F. above cooling water temperature, condensing a substantial amount of the water vapor in the combustion gases, and the nitrogen, carbon dioxide and remaining water vapor exit from the cooler and pass through a separator where entrained moisture is removed. The remaining gas mixture is then passed to an adsorption section area 12 shown on FIG. 1.

The primary function of the adsorbers is to remove carbon dioxide from the nitrogen gas, and as a secondary function, they readily adsorb the water vapor. The adsorption section consists of two vessels or chambers 14 and 16 filled with molecular sieve material, a preferred material being Zeolite 5A, a product of Union Carbide Corporation, Linde Division, described in their Patent No. 2,882,243. The feed gas mixture enters the bottom of either vessel or chamber 14 or 16, through lines 18a and 18b, each being valve controlled and timed so that the flow is only to one of the vessels or the other. The gas feed mixture flows upwardly in the beds exiting near the top in either of product lines 2a or 20b depending upon which bed is on the adsorption cycle. This exit gas is known as the product gas or primary effluent.

The system economically can be designed to handle up to 15,000 cubic feet per hour product nitrogen, although larger capacities are possible.

During its passage through the molecular sieve bed, water vapor and carbon dioxide are adsorbed from the inert gas leaving primarily nitrogen gas. While one of the beds is on an adsorption cycle the other bed is being desorbed or reactivated. Individual valves in the inlet and outlet or product lines (18 and 20) determine which of the beds is on the adsorption cycle. For the purpose of desorption, the chambers or vessels 14 and 16 are provided with lower exhaust lines 22a and b which are individually valve controlled. Also as part of the desorption or regeneration portion of the system are purge lines 24, 24a and 24b, repressurizing line 26 and vacuum system 28, the purge and repressurizing lines being connected to the top of chambers 12 and 14 and also being individually valve controlled. The vacuum system 28 is connected to the bottom of the chambers or vessels via exhaust lines 22, 22a and 22b so that in operation the desorption flow, purge and repressurizing flows will be from the top down in each vessel opposite in direction to the adsorption flow.

It is noted that the purge line 24 is connected to the product line 20 so that the purge flow will be a metered amount of clean dry product gas to sweep the desorbed carbon dioxide and water vapor from the molecular sieve material. Metering of the flow is accomplished by using small diameter purge lines (24, 24a, 24b) and a small capacity purge valve, item 30 in line 24. Preferably the amount of purge, for the adsorption in question will be about 11% of the product flow or less. Check valves 32a, b in lines 24a, b prevent the flow of product gas in the purge lines in a reverse direction to the purge flow.

The repressurizing line 26 is also valve controlled by means of valve 34, and is connected between the tops of the vessels or chambers 14 and 16 so that repressurizing of the bed undergoing desorption occurs from the top downwardly, using product flow from the vessel on adsorption. This prevents jarring or fluidizing of the bed being repressurized during the repressurizing step and the powdering that would likely result. The repressurizing line is larger in diameter than the purge line, so that the bed which has just been regenerated can be repressurized as rapidly as possible.

The regeneration or desorption period sequence is as follows. The chamber to be desorbed, either chamber 14 or 16, is first evacuated and then purged for a period of time (to be described in more detail). After a set time the vacuum cycle times out and the chamber is repressurized, after which the beds are switched. In this way, each chamber is saturated and regenerated in turn with no break in the product flow.

The vacuum system 28 utilized for desorption employs two pumps, one to serve as a roughing pump 36 for an initial evacuation and the other serving as a booster pump 38 to attain the very high vacuums required in accordance with the invention to release the carbon dioxide and water vapor from the molecular sieve material in the time allotted. The roughing pump 36 is a water jet pump, shown in the plan view of FIG. 2, and will be described with reference to this view. The booster pumps is a lobe pump shown in the elevation view of FIG. 3. Also part of the vacuum system is separation chamber 40.

The water jet pump (FIG. 2) is a combination of components which includes a centrifugal pump 42 designed to remove from the bottom of the separation chamber 40 a flow of water which can be described as the hurling medium, and to circulate this flow through conduit 44 upwardly and laterally relative to the separation chamber to a multi-jet nozzle 46. The nozzle faces an open end 48 of a venturi tube 50, and has a large number of small openings so as to inject into the venturi tube open end a large number of fine streams of the hurling medium. The flow of the hurling medium through the venturi creates a pressure differential in the venturi which in turn establishes a vacuum in a chamber 52 encompassing and in flow communication with the gap 54 between the venturi open end 48 and the nozzle 46.

The jet pump 36 functions by circulation of a liquid through its internal mechanisms to create a vacuum, the centrifugal pump 42 circulating the water through the multi-jet nozzle 46, venturi 50 and returning it to the separation chamber. The water force and high velocity across the gap 54 between the nozzle and venturi entrains material in the chamber 52 creating a smooth steady vacuum in the chamber.

In the separation chamber 40, the water is subjected to a circular velocity, resulting in a centrifugal action which forces the water to the periphery of the chamber while the lighter gases ($CO_2$) go to the center and are discharged out the top, in vent line 56, FIG. 1. The circulating water is returned to the bottom of the separation chamber for recirculation as the hurling medium through the centrifugal pump 42.

A suitable jet pump is one made by the Kinney Vacuum Division of New York Air Brake Company, described in their manual No. 3200.8 (dated April 1966).

The booster pump 38 is disposed at the top of the chamber 40 and has an upper inlet end 58 (FIG. 3), and a lower exhaust end 60 leading via conduit 62 to the jet pump vacuum chamber 52. The pump consists of two figure eight shaped rotors 64 enclosed in a machined housing 66, the rotors being supported at each end by ball bearings (not shown). A suitable drive 68 turns the rotors, vacuum pumping being accomplished by trapping a volume of fluid between each rotor and the pump housing. By revolving the rotors, this volume is carried to the exhaust side of the pump, conduit 60, and discharged.

A suitable lobe type pump is also manufactured by the Kinney Vacuum Division of New York Air Brake Company shown in their manual 3185.8 (dated December 1966).

Turning back to FIG. 1, there is shown a drain line 70 at the bottom of the separation chamber 40, and a water supply line 72 leading into the separation chamber. The purpose of the drain and supply lines is to remove carbon dioxide and other materials entrained in the water, by continuously replenishing the hurling medium by make-up, and in addition to effectively maintain the hurling medium at a predetermined temperature. In this respect the efficiency of the jet-pump is temperature dependent.

In operation, the water jet pump is first started, to carry the pressure in the system down to about 23" Hg, or about 180 mm. Hg abs. The pump is a low capacity pump, and is suitable for exhausting the chamber undergoing desorption, but does not have a sufficient capacity to handle a significant volume of purge flow. The booster pump is switched on automatically when the pressure reaches a predetermined point, taking the system down further to at least 26" Hg and preferably at least about 28" Hg (100 mm. Hg abs. and about 45 mm. Hg abs., respectively). The booster pump is a high capacity pump, effective even with the use of a purge flow, but it cannot be started at atmospheric pressure.

The effluent waste gas in the vent line which is vented to the exterior, via line 56, and without purge, comprises about 90 to 100% carbon dioxide. With purge, the gas is about 40% carbon dioxide and 60% nitrogen.

The above described vacuum system has particular utility in connection with the present invention in that the beds are smoothly subjected to a vacuum from atmospheric down to the desired pressure (since the pumps are in series relationship with the booster pump coming on at a preset pressure) without shocking the bed or without the danger of pulverizing the bed. In addition, the booster pump may be lubricated, via the water supply line shown (72b, FIG. 1) with water introduced directly into the vacuum line or inlet vacuum end 58 of the booster pump so that there is no danger of oil backflowing to the beds. The water supply line 72c leading to the booster pump housing is for the purpose of cooling the oil which is used in the bearing lubrication system for the booster pump. This oil does not get into the vacuum system.

As a further advantage, pipe scale will not jam a lobe pump where it can jam a piston-type mechanical pump. Further, it is quite apparent that the bed undergoing desorption can be repressurized to or close to atmospheric pressure if desired following desorption and prior to switching beds, since the bed going onto desorption can be evacuated from atmosphere. In this way, a continuous product flow can be maintained.

In this respect, a cycle time of about 10 minutes for adsorption or desorption, may be used, and preferably about 8 minutes. The cycle may be broken down as follows:

STATEMENT OF OPERATION OF SYSTEM

| Step | Operation | Time |
|---|---|---|
| (1) | The chamber being reactivated is closed off. A dead time occurs at the start when feed gas is passed through both chambers in an upward direction, before the chamber to be reactivated is closed off. | 5 sec. |
| (2) | Vacuum valve V44, 45 opens on chamber being reactivated. | 10 sec. |
| (3) | Water jet pump which runs continuously pulls about 23″ Hg vacuum. This vacuum alone evacuates 10–15 cu. ft. of gas from the chamber. | 30 sec. |
| (4) | Pressure responsive switch PS1, PS2 at about 23″ Hg starts the booster pump, which pulls the vacuum to 26″ Hg. Without purge the vent gas is 90–100% CO$_2$. | 10 sec. |
| (5) | Pressure responsive switch PS3, PS4 at about 26″ Hg opens the purge valve 30 allowing a metered amount of purge flow (in a narrow diameter line) to flow downwardly in the chamber being reactivated. The purge flow is 10 c.f.m. to about 15 c.f.m., or about 11% of the product stream. With purge, the vent gas is about 40% CO$_2$, 60% N$_2$. | 5½ min.+ |
| (6) | As the purge timer times out, the vacuum valve V44, 45 in the vacuum lines 22a, b closes. Also repressurizing valve 34 in repressurizing line 26 is opened. This is a much larger line than the purge line for rapid repressurizing. Repressurize occurs from the top down. | 1½–2 min. |
| (6.1) | During repressurizing, feed gas continues to flow through the adsorption chamber on the adsorption cycle. | |
| (6.2) | Purge valve 30 is pressure responsive and closes at about 25″ Hg vacuum during the repressurizing step. | |
| (6.3) | The repressurizing valve 34 also closes at slightly less than operating pressure. At the same time the feed valve in the line 18a or 18b opens for product flow upwardly in the reactivated chamber—feed flowing at this stage into both chambers. | 5 sec. |

+Duration controlled by purge timer.

In a typical example, the adsorption bed may have a capacity in the order of 15,000 cubic feet per hour product nitrogen. There will be a product requirement of less than .1% impurities with respect to CO$_2$. To be competitive with conventional monoethanolamine systems, the bed will be sized for a cycle period of 8 to 10 minutes maximum. In other words, at the end of 8 to 10 minutes, there will be a break-through in the product purity requiring switching and desorption of the bed or regeneration. A larger bed could be employed to extend the cycle time, but then this would not be competitive with conventional MEA systems.

In order to hold the breakthrough point to the 8 or 10 minute period, it is necessary during the regeneration step to reduce the loading to a predetermined amount. For instance, the water loading may typically be reduced from 16% to about 13% and the CO$_2$ loading from about 5% to about 2%.

The problem is not so much in regeneration of the bed with respect to the CO$_2$ loading, as this loading readily is lowered to the desired point, but rather with respect to the residual water loading, and the system is designed for the water loading. Assuming that the bed is at ambient temperature of for instance 90° F., the boiling point of water at about 28 inches mercury is about 100° F. instead of 212° F. at atmospheric pressure. It is quite clear that the closer one can approach room temperature with the boiling point, that is lowering the pressure, the more effective will be the desorption of the molecular sieve material of water.

Since carbon dioxide is a gas at high pressures, its desorption problem is not as great.

Accordingly, by reducing the pressure to approximately 27 inches of mercury, it was discovered that the water loading, in the 8 to 10 minute cycle, would roughly be reduced from about 16% to about 13% loading, which lower limit was effective to avoid a breakthrough, in the 8 to 10 minute cycle, of water vapor above the −50° F. dew point requirement. In actual practice, the residual loading is reduced to the point that the dew point is about −65° F. at the end of a cycle, defined as the point where the CO$_2$ concentration in the product approaches .1%.

The above can be accomplished with a minimum purge rate, for instance about a 11% purge (10 to 15 cubic feet per minute) as compared to about a 30% purge required in the "heatless" cycle.

Although the invention has been described with reference to specific embodiments, variations within the scope of the following claims will be known to those skilled in the art.

What is claimed is:

1. An adsorption process for removing gas impurities of the class consisting of carbon dioxide, water vapor, hydrogen sulfide and ammonia from a gas stream comprising the steps of flowing the feed stream at near atmospheric pressure alternately to first and second adsorption beds in an adsorption period to remove therefrom components which are adsorbable in said beds to produce a product stream;

simultaneously desorbing the bed which is not on an adsorption cycle in a desorption period and a high vacuum to reduce the loading on said bed;

purging said bed with product gas during desorption;

repressurizing the bed being desorbed in a repressurizing period following said desorption period substantially to the adsorption pressure;

the pressure in the beds varying between a vacuum and near atmospheric wherein the vacuum is imposed upon the bed undergoing desorption in a first roughing stage to a vacuum of at least about 23″ Hg by means of a water jet pump, and in a second finishing stage by means of a booster pump of the lobe type to a vacuum of at least about 28″ Hg.

2. The process of claim 1 wherein the bed undergoing desorption is purged with less than about 11% of the product flow sufficient to sweep the bed for a portion of the desorption period;

the desorption and purge steps being carried out in a direction countercurrent to the direction of flow of the feed stream during the adsorption step.

3. The process of claim 1 wherein the rate of purge flow is less than about 11% product stream;

the desorption and purge steps being carried out in a direction countercurrent to the direction of flow of the feed stream during the adsorption step.

4. The process of claim 3 wherein the feed stream contains an amount of water vapor so that the loading of water vapor on the bed is varied from about 16% to 13% of total loading capacity during the adsorption and desorption steps, the desorption period being less than about six minutes for a total cycle time of less than about ten minutes.

5. The process of claim 1 wherein the adsorption is for removing carbon dioxide and water vapor from a nitrogen containing gas stream to reduce the carbon dioxide content to less than .1% by volume.

6. A process which includes the step of generating a nitrogen containing gas stream near atmospheric pressure, the stream containing impurities of the class consisting of carbon dioxide, water vapor, hydrogen sulfide and ammonia, the improvement comprising flowing the gas stream alternately to first and second adsorption beds in an adsorption period to remove therefrom components which are adsorbable in said beds to produce a product stream;

the adsorption period being carried out at substantially the pressure of said stream;

said adsorption beds being a molecular sieve material;

simultaneously desorbing the bed which is not on an adsorption cycle in a desorption period in a first roughing stage to a vacuum of at least about 23″ Hg by means of a water jet pump, and in a second finishing stage by means of a booster pump of the lobe type to a vacuum of at least about 28″ Hg;

purging said bed with product gas during the desorption period to sweep the bed;

repressurizing the bed being desorbed in a repressurizing period following desorption substantially to the adsorption pressure;

the adsorption period being terminated prior to a breakthrough in an arbitrarily set product purity limit;

the combined desorption and repressurizing periods being substantially equal to the adsorption period.

7. Adsorption apparatus comprising first and second adsorption beds containing an adsorbent material;

inlet and product outlet means to said beds including valve means wherein said beds can be placed alternately on an adsorption cycle and subsequently on a desorption cycle;

vacuum means connected to said beds to alternately impose a vacuum on said beds for said desorption cycles;

said vacuum system comprising a first water jet roughing pump to reduce the vacuum to a predetermined point, and a booster pump of the lobe type to carry the vacuum to a lower pressure.

8. Apparatus according to claim 7 wherein said pumps are in series with the booster pump positioned in the vacuum line between the jet pump and said beds.

9. The apparatus of claim 8 wherein the jet pump is operable continuously.

10. The apparatus of claim 7 including a separation chamber;

said jet pump including a centrifugal pump adapted to produce a hurling medium of a fluid from said separation chamber, a multi-jet nozzle, in communication with said centrifugal pump, and a venturi spaced from the nozzle receiving at one end the flow from the nozzle, said nozzle and venturi defining a vacuum space there between;

the booster pump being in fluid communication with said vacuum space.

11. The apparatus of claim 8 further including a valved purge means connected between said chambers and the product outlet means therefor for recycling a portion of the product flow to the chamber on desorption, the points of connection of the purge means with the chambers being spaced from the points of connection of the inlet means with the chambers.

12. The apparatus of claim 11 wherein said purge means is pressure responsive.

13. The apparatus of claim 8 wherein said lobe pump is water lubricated.

References Cited

UNITED STATES PATENTS

| | | | |
|---|---|---|---|
| 2,660,232 | 11/1953 | Noon et al. | |
| 3,085,379 | 4/1963 | Kiyonaga et al. | 55—58 |
| 3,155,468 | 11/1964 | DeMontageuil et al. | 55—58 |
| 3,176,444 | 4/1965 | Kiyonaga | 55—58 |
| 3,255,576 | 6/1966 | Dawkins | 55—192 |
| 3,355,860 | 12/1967 | Arnoldi | 55—62 |
| 3,367,269 | 2/1968 | Nelson et al. | |
| 3,399,510 | 9/1968 | Kauer et al. | 55—163 |

REUBEN FRIEDMAN, Primary Examiner

CHARLES N. HART, Assistant Examiner

U.S. Cl. X.R.

55—58, 70, 73, 179